US012675429B2

(12) United States Patent
Nelson et al.

(10) Patent No.: US 12,675,429 B2
(45) Date of Patent: Jul. 7, 2026

(54) USB DEVICE-INITIATED DATA TRANSFERS AND PLATFORM OFFLOAD CAPABILITIES

(71) Applicant: Intel Corporation, Santa Clara, CA (US)

(72) Inventors: Aruni Nelson, Folsom, CA (US); Abdul Ismail, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 9 days.

(21) Appl. No.: 18/755,954

(22) Filed: Jun. 27, 2024

(65) Prior Publication Data

US 2025/0199993 A1      Jun. 19, 2025

Related U.S. Application Data

(60) Provisional application No. 63/611,568, filed on Dec. 18, 2023.

(51) Int. Cl.
G06F 13/42 (2006.01)
G06F 13/38 (2006.01)

(52) U.S. Cl.
CPC ........ G06F 13/4282 (2013.01); G06F 13/382 (2013.01); *G06F 2213/0042* (2013.01)

(58) Field of Classification Search
CPC .............. G06F 13/4282; G06F 13/382; G06F 2213/0042
See application file for complete search history.

(56) References Cited

U.S. PATENT DOCUMENTS

| | | | |
|---|---|---|---|
| 2008/0028113 A1* | 1/2008 | Guo ...................... | G06F 13/426 |
| | | | 710/104 |
| 2009/0216981 A1* | 8/2009 | Diefenbaugh ........ | G06F 13/385 |
| | | | 711/E12.001 |
| 2013/0138860 A1* | 5/2013 | Moore ................ | G06F 13/4221 |
| | | | 710/313 |
| 2016/0125838 A1* | 5/2016 | Hundal .................. | G09G 5/006 |
| | | | 345/520 |
| 2017/0212724 A1* | 7/2017 | Howard .................. | G06F 5/065 |
| 2019/0220601 A1* | 7/2019 | Sood ....................... | G06F 21/53 |
| 2022/0206961 A1* | 6/2022 | Lempel .............. | G06F 12/0835 |
| 2022/0276981 A1* | 9/2022 | Nelson ................ | G06F 13/4295 |

* cited by examiner

*Primary Examiner* — Henry Tsai
*Assistant Examiner* — Harry Z Wang
(74) *Attorney, Agent, or Firm* — Schwegman Lundberg & Woessner, P.A.

(57) ABSTRACT

Various systems and methods for USB Device-initiated data transfers and platform offload capabilities, and related processing and communication capabilities in a USB Host, are discussed. An example method for data offloading of data from a USB Device to a USB Host includes: receiving a data available notification from a USB Device connected to a USB Host via a USB interface; using a USB Host Controller to read buffered data from a buffer of the USB Device, in response to the data available notification; and providing the buffered data from the USB Host Controller to an Offload Engine of the USB Host.

20 Claims, 8 Drawing Sheets

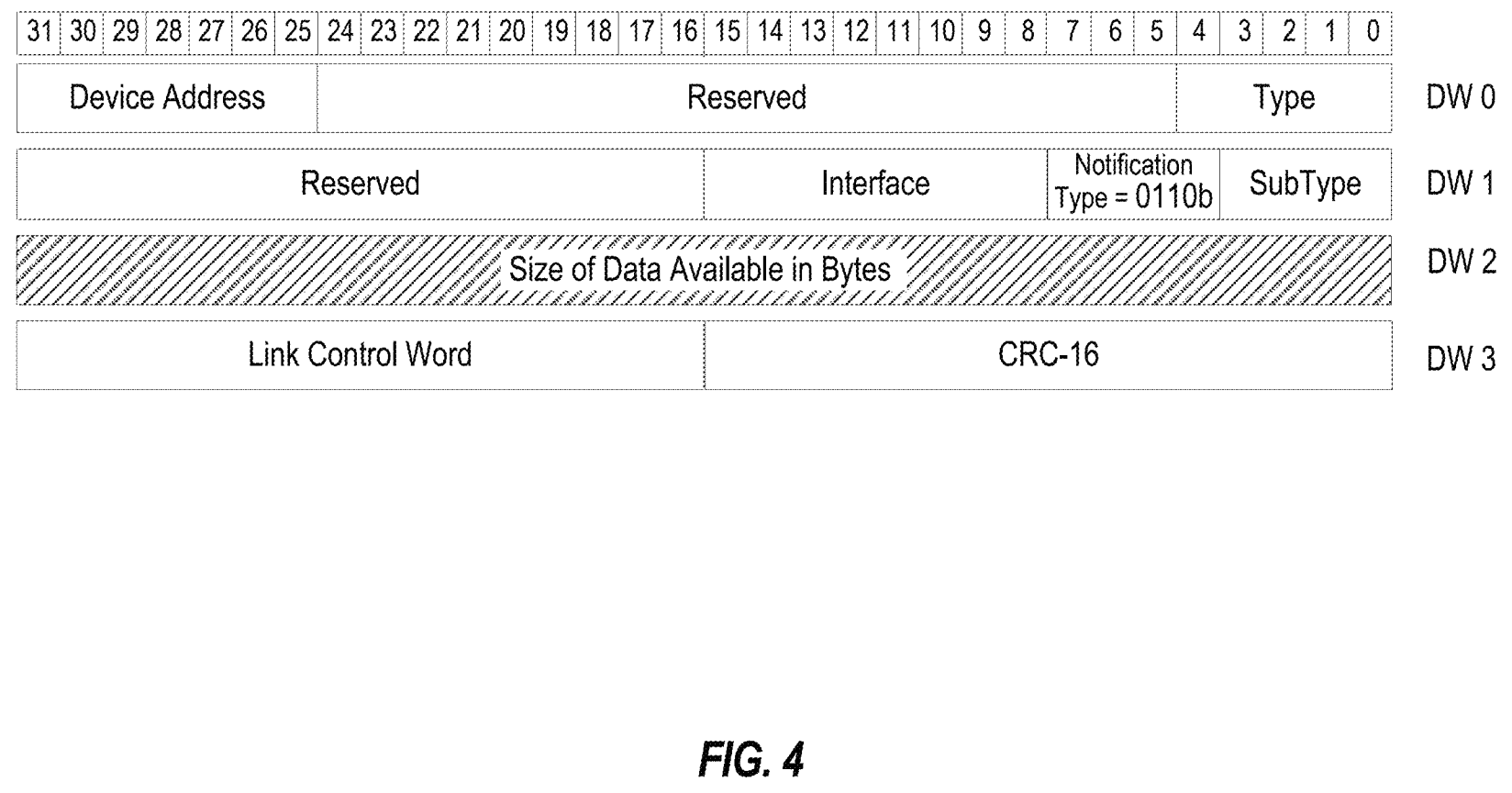

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| Device Address | | | | | | | Reserved | | | | | | | | | | | | | | | | | | | | | Type | | | | DW 0 |
| Reserved | | | | | | | | | | | | | Interface | | | | | | | | | Notification Type = 0110b | | | | | | SubType | | | | DW 1 |
| Size of Data Available in Bytes | | | | | | | | | | | | | | | | | | | | | | | | | | | | | | | | DW 2 |
| Link Control Word | | | | | | | | | | | | | | | | CRC-16 | | | | | | | | | | | | | | | | DW 3 |

*FIG. 4*

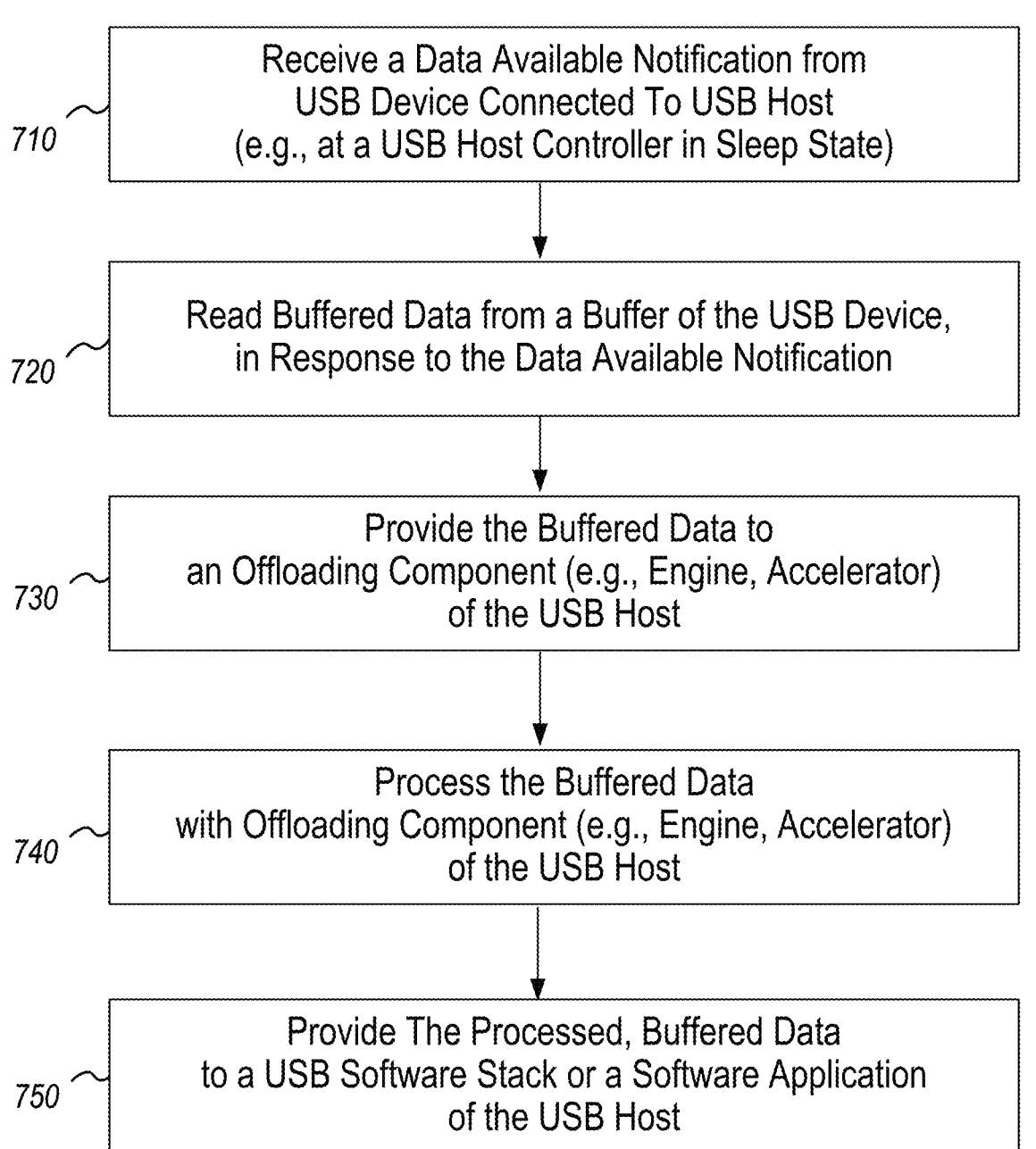

700

710 — Receive a Data Available Notification from USB Device Connected To USB Host (e.g., at a USB Host Controller in Sleep State)

720 — Read Buffered Data from a Buffer of the USB Device, in Response to the Data Available Notification 730 — Provide the Buffered Data to an Offloading Component (e.g., Engine, Accelerator) of the USB Host 740 — Process the Buffered Data with Offloading Component (e.g., Engine, Accelerator) of the USB Host 750 — Provide The Processed, Buffered Data to a USB Software Stack or a Software Application of the USB Host

FIG. 7

USB DEVICE-INITIATED DATA TRANSFERS AND PLATFORM OFFLOAD CAPABILITIES

PRIORITY CLAIM

This application claims the benefit of priority to U.S. Provisional Patent Application No. 63/611,568, filed on Dec. 18, 2023, and titled "USB DEVICE-INITIATED DATA TRANSFERS AND PLATFORM OFFLOAD CAPABILITIES", which is incorporated herein by reference in its entirety.

BACKGROUND

Current implementations of data transfers between Universal Serial Bus (USB) devices, such as from a connected USB "Device" peripheral to a USB "Host" computing system, are initiated by software on the USB Host. This use of software operations causes increased access to system memory and increased CPU utilization even for simple data transfers.

Although USB Host Controllers on a USB Host provide some limited functions for processing device notifications from a USB Device, such notifications are limited to control and management of the USB Device. In addition, USB Host Controllers do not support standardized offload/accelerator mechanisms. Rather, existing USB Host Controllers act primarily as DMA engines, to perform USB data transfers based on the input/output (IO) request packets received from software on the USB Host.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 4 illustrates a data structure for a USB "Data Available Device Notification", according to an example;

FIG. 7 illustrates a flowchart of example operations performed by a USB Host and a USB Device for Notification-Based USB Data Retrieval and Data Offloading, according to an example.

DETAILED DESCRIPTION

Figure 1:
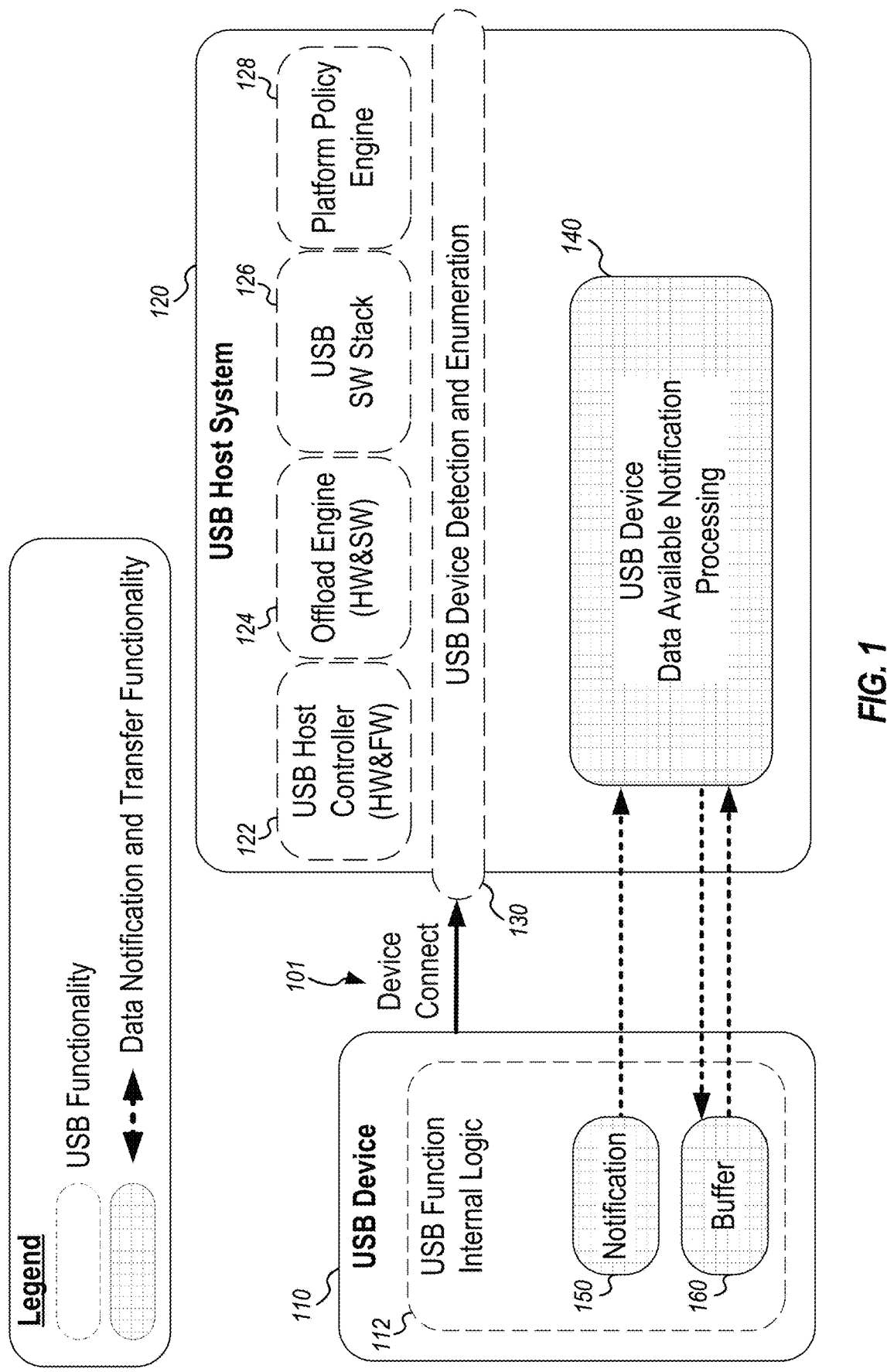
FIG. 1 illustrates entities involved in USB Data Notification and Data Transfer operations, according to an example.

In the following description, for purposes of explanation, numerous specific details are set forth in order to provide a thorough understanding of some example embodiments. It will be evident, however, to one skilled in the art that the present disclosure may be practiced without these specific details.

The following disclosure relates to configuration and data processing occurring in connection with USB Device and USB Host computing devices. The following provides an architecture that enables data to be transmitted between a USB Device (e.g., on a first bus) and a different offload engine of the USB Host (e.g., on a second fabric/bus, such as is provided by a System-on-Chip (SoC) or accelerator), using a USB Host Controller of the USB Host as an intermediary. Thus, the following techniques are primarily directed to the coordination of USB Host↔USB Device data transfers on a USB Interface, rather than the transfer of data between two connected USB Devices.

Current approaches for Device-Host data transfers via USB are typically based on software-initiated accesses of the USB Host to a respective USB Device. Although some offload capabilities have been introduced in select implementations of USB Host Controllers on the USB Host, such capabilities have been introduced in a proprietary fashion and are generally hidden from the USB Device. Further, these implementations do not optimize the offload capabilities or provide any capability for end-to-end management among system software of the USB Host, the USB Host Controller, and the USB Device.

Also, in some current approaches, software determines the transfer requests that need to be made with a USB Device function, using IO Request Packets (IRPs). IRPs are translated by the USB Host Controller to USB packets on the USB connection to move function-specific data from/to the USB Device. The USB Host Controller provides a high-speed bus-mastering interface to/from main system memory, using transfer descriptors that are set up by the CPU, based on the originating IRP. However, as noted, this leads to increased system memory access and increased CPU utilization even for small data transfers.

Some current implementations also allow the USB Host Controller to send the data received from a USB Device to a processing unit and utilize the memory of this processing unit. However, the USB Host Controller still relies on the system memory accesses to read the transfer descriptor list and eventually transfer the data to the system memory. As a result, even simple data transfers from a USB Device in current computer architecture implementations may lead to excess system memory accesses; increased CPU utilization; increased overall system power consumption; and a reduced opportunity for the CPU to transition to lower power states (e.g., power-saving "C" states in x86 hardware).

The following introduces an improved USB Device data transfer capability and provides an approach that reduces platform power consumption and CPU utilization on the USB Host when transacting with USB Devices that support this improved data transfer capability. This results in a number of technical benefits, including but not limited to: efficiently utilizing the USB link based on when the USB Device has data available to transfer (leading to increased USB Link low power residency); increased opportunities for the CPU to enter lower power states (e.g., C-States); and reduced system main memory access.

The following approaches may be implemented with changes or adaptations to the USB Host, changes or adaptations to the USB Device, and updates to the USB 3.2 and USB Device Class specifications. However, these approaches may also be used independent of specification or requirement changes.

In an example, changes to the USB Host include a new definition of a standardized register set to advertise a data offload capability. Other changes include new logic (implemented in hardware (HW), firmware (FW), or a combination of both) that will interface with and provide messages between a USB Host Controller and an Offload Engine on the USB Host. Other changes include new logic in a Platform Policy Engine on the USB Host, which is used to describe the support for specific USB Device Class offload and new requirements for the USB Stack. The details of these changes on the USB Host are discussed with reference to FIG. 3, below.

In an example, updates to the USB Device and Device Class Specifications include updated Device Descriptors to indicate support for data offloading and new logic to generate the new notification indicating data availability. The details of these changes on the USB Device are discussed with reference to FIG. 2, below, and an example notification data structure is discussed with reference to FIG. 4.

While the following approaches may be implemented based on a standardization of certain registers and messages, the following techniques can also provide a data offload mechanism that can be used independently of standardization. Further, a variety of adaptations may be made based on the following approaches for data retrieval, offloading, notification, and transfer.

FIG. 1 depicts the entities involved in data transfer operations between a USB Device and a USB Host, based on a data-ready notification from the USB Device. This figure depicts the use of a USB Device 110 (e.g., a peripheral, such as a camera, microphone, storage drive, etc.) connected to a USB Host 120 (e.g., a computing system). The USB Device 110 includes USB Function Internal Logic 112, and the USB Host 120 includes a USB Host Controller 122 (e.g., hardware and firmware), an Offload Engine 124 (e.g., hardware and software), a USB SW Stack 126 (e.g., software), and a Platform Policy Engine 128 (e.g., software). Other entities and components are not depicted for simplicity.

Figure 3:
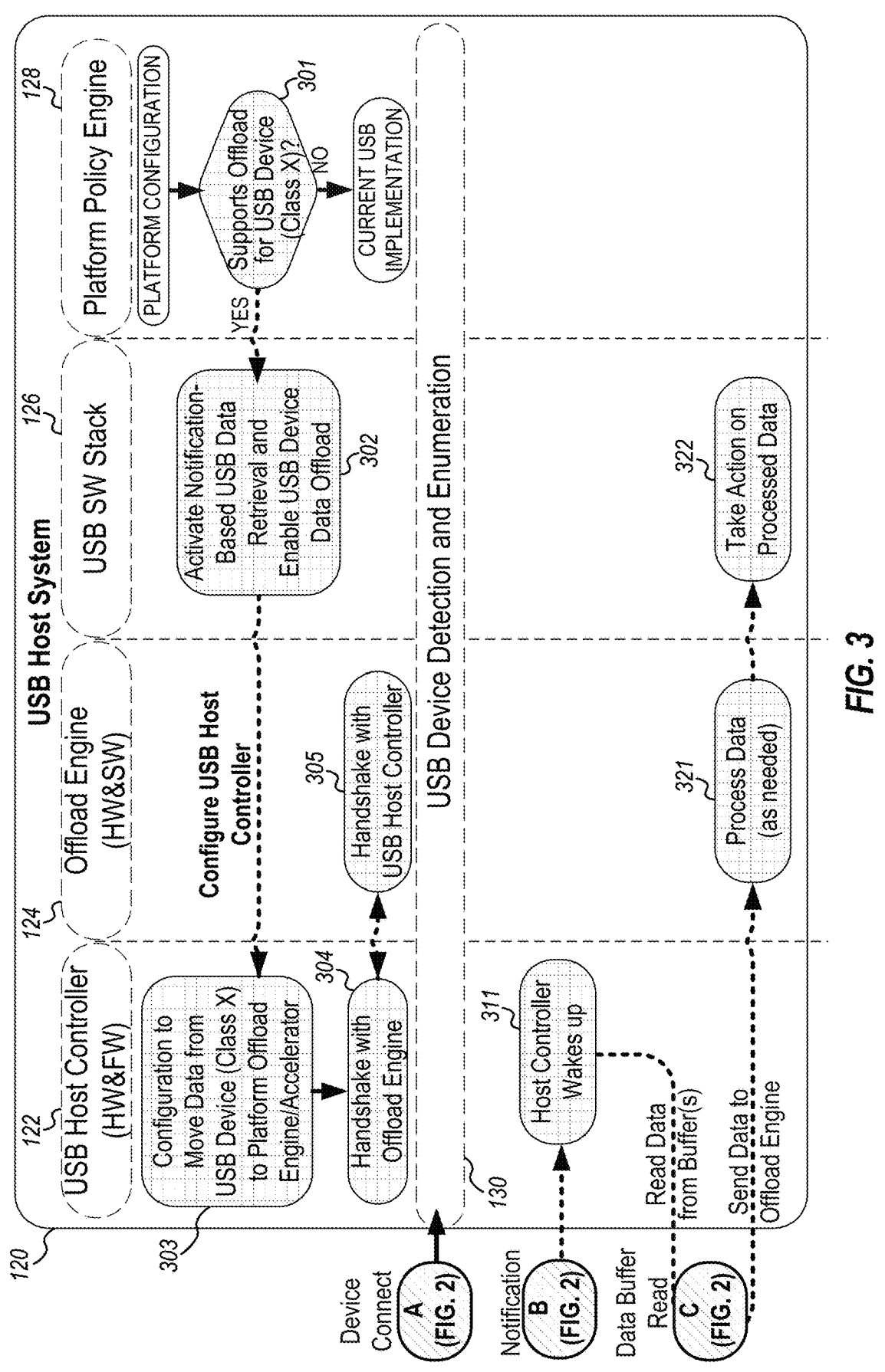
FIG. 3 illustrates aspects of a USB Host to support Notification-Based USB Data Retrieval and Data Offloading, according to an example.

In this example, the USB Device 110 performs a Device Connect 101 with the USB Host 120, via the use of USB Device Detection and Enumeration 130 functionality provided in the USB Host 120. FIG. 3 depicts additional handshakes and configurations that enable the functionality of notification-based USB data retrieval at the USB Host 120, to enable and control data offloading from the USB Device 110 to the USB Host 120.

In the USB Host 120, the following features are added to support notification-based USB data retrieval and to enable USB Device data offloading directly to the Offload Engine 124. First, a standardized register is established in the USB Host Controller 122 to advertise a capability for supporting the data offloading capability. Second, new logic (e.g., hardware, firmware, or combination of both) is introduced in the USB Host Controller 122 to comprehend the platform and USB Device capabilities for notification-based USB data retrieval and data offloading. Third, new interfaces and messages are defined between the USB Host Controller 122 and the Offload Engine 124 to establish offload handshake and direct access to resources of the Offload Engine 124. Fourth, new logic is defined in the Platform Policy Engine 128 that determines the availability of offload capability in the computing platform and that triggers the use of the data available notification processing.

New functionality may be introduced into the USB SW Stack 126 to enable operations from notification-based USB data retrieval and data offloading. With the use of data offloading, the USB SW Stack 126 does not need to initiate data transfers; instead, the system can rely on the USB Host Controller 122 to initiate on-demand data retrieval from the USB Device 110 based on the new notifications received from the connected USB Device 110.

The following functionality may be added among the components of the USB Host 120 to enable notification-based USB data retrieval and data offloading. First, the USB SW Stack 126 is adapted to determine a capability of the USB Host Controller 122 to support offload and a capability of the USB Device 110 to support the new device notification type. Second, a new message exchange is introduced between the USB SW Stack 126 and the USB Host Controller 122 to enable and configure the data offload capability based on the USB Host and USB Device support for this feature. Third, a new driver-to-driver interface message exchange is introduced between the Platform Policy Engine 128 and the USB SW Stack 126, such as to receive a trigger from the Platform Policy Engine 128 that initiates and/or enables notification-based USB data retrieval and data offloading. These and other enhanced capabilities of the USB Host Controller 122 and the Offload Engine 124 (or other engines) may be made available or adapted in the platform according to the present techniques.

Figure 2:
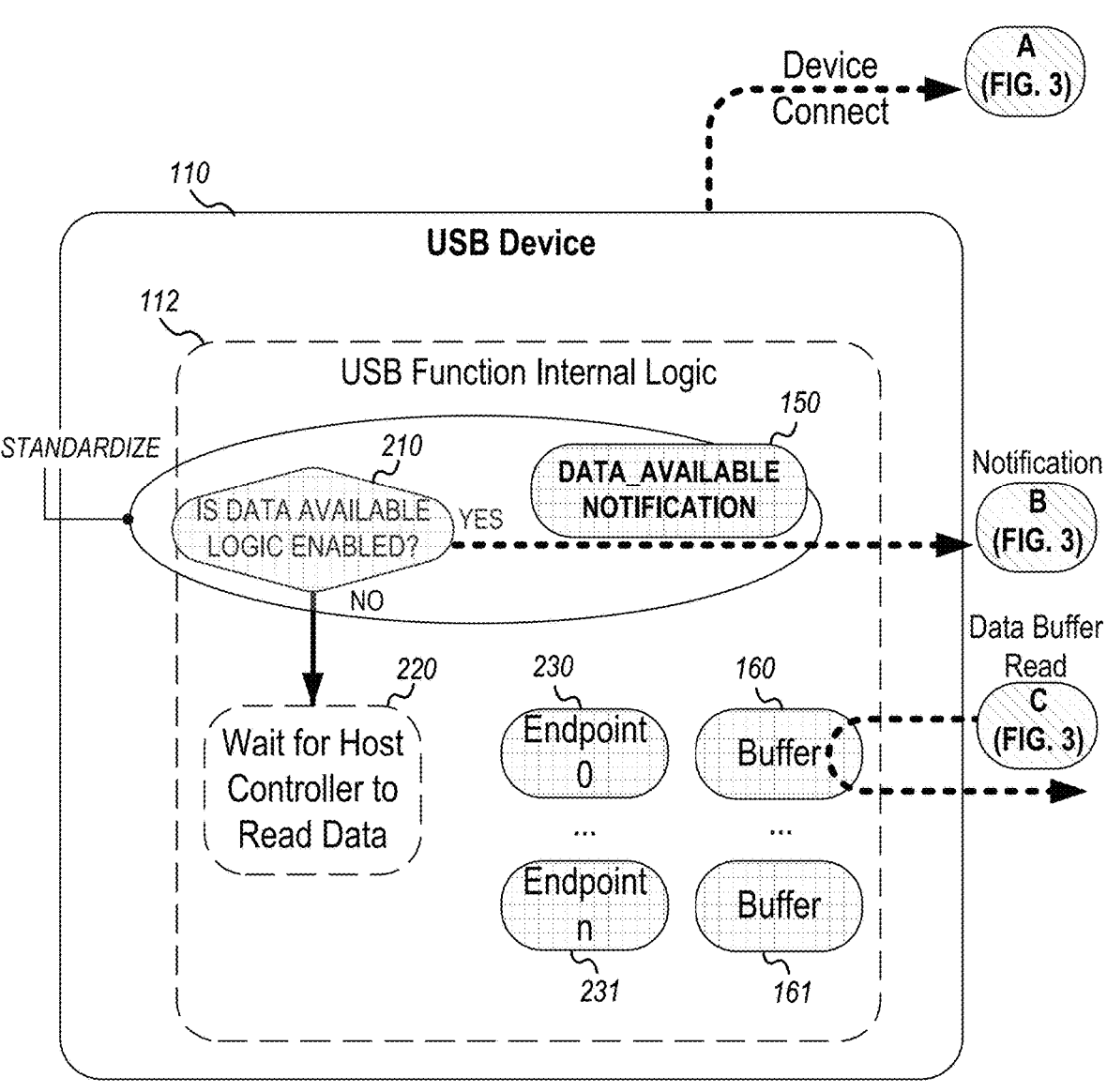
FIG. 2 illustrates aspects of a USB Device to support Notification-Based USB Data Retrieval and Data Offloading, according to an example.

FIGS. 2 and 3 depict further aspects of the USB Device 110 and the USB Host 120 to support notification-based USB data retrieval and data offloading. In FIG. 2, operations in the USB Device 110 are shown, whereas in FIG. 3 operations in the USB Host 120 are shown. FIG. 2 includes a reference to the standardization of a DATA_AVAILABLE notification, which is discussed in more detail below. It will be understood that other message types and notification formats may also be used and potentially standardized.

As shown in FIG. 2, a USB Device 110 can perform a Device Connect operation with the USB Host 120 (shown in FIG. 3). This can involve a typical USB Device Detection and Enumeration 130 at the USB Host 120. For example, the USB Host 120 performs the electrical detection of the USB Device 110 as the USB Device 110 pulls down the differential pair of data transmission wires. Thereafter, polling and a handshake occurs between the USB Host 120 and USB Device 110, followed by the requests from the USB Host 120 to retrieve the USB Device Descriptors to understand the capabilities of the USB Device 110 that is connected.

The USB Function Internal Logic 112 of the USB Device 110 determines (e.g., with evaluation 210) whether data available logic is enabled at the USB Device 110. If the data available logic is not enabled at the USB Device 110, then typical USB operations that wait for a Host Controller of the USB Host 120 to read data are used (in operation 220). If the data available logic is enabled at USB Device 110, then the DATA_AVAILABLE notification is provided (when applicable) as the notification 150 to the USB Host 120. This DATA_AVAILABLE notification notifies the USB Host 120 that data is awaiting in a buffer.

Next, the USB Function Internal Logic 112 responds to a data buffer read from the USB Host 120, shown as a read of the data buffer 160 performed by the USB Host 120. The data in the data buffer 160 may be provided by an endpoint such as Endpoint 0 230. Other buffers corresponding to other endpoints, such as data buffer 161 corresponding to Endpoint N 231, may also be configured.

The functionality to identify and respond to the DATA_AVAILABLE notification and retrieve the available data in the data buffer 160 is implemented in the USB Host 120. As shown in FIG. 3, the USB Host Controller 122 is configured to support one or more available offload engines for specific USB Device types/classes, such as Offload Engine 124 (e.g., a specialized accelerator configured to process a particular class of USB Device, e.g., a USB device that provides video or image data). Based on the capabilities supported and the USB Device type, the notification and offloading functions are enabled.

A connected USB Device (e.g., USB Device 110) that supports the offload capability is configured to send a new DATA_AVAILABLE notification to the USB Host Controller 122, as discussed above. A Platform Policy Engine 128 of a connected USB Host (e.g., USB Host 120) performs a determination (at evaluation 301) of whether the USB Host 120 supports the offloading capability for data provided from the USB Device 110 with this notification, for one or more particular classes of USB devices (e.g., indicating support for automatically offloading data from USB Class X devices to a particular offload location on the USB Host 120). Then, a USB Device Class driver (e.g., provided in the USB SW Stack 126) can configure and enable the data offload capability in the USB Host Controller 122, shown in operation 302. This operation activates the notification-based USB data retrieval functionality in the USB Host Controller 122 and enables the USB Host Controller 122 to offload data to the Offload Engine 124 (e.g., an accelerator). This enables the USB Host Controller 122 to automatically transfer data from/to the USB Device 110 to the Offload Engine 124 without requiring the software of the USB Host 120 to set up transfer descriptions in its system memory.

Additional configuration may include operation 303, to establish a configuration in the USB Host Controller 122 to automatically move data from a USB Device of a particular class to the Offload Engine 124 (or accelerator, specialized hardware, etc.). This configuration may be based on coordinating operations 304 of the USB Host Controller 122 to handshake with the Offload Engine 124, and operation 305 of the Offload Engine to handshake with the USB Host Controller 122. The handshake(s) may include configuring a data transfer mechanism between the USB Host Controller 122 and the Offload Engine 124 (e.g., configuration of DMA or inter-process communication), and other setup actions such as synchronizing the clocks (e.g., if necessary for transfer of periodic data from the USB Device 110).

After this configuration, the DATA_AVAILABLE notification is received from the USB Device 110. The USB Host Controller 122 awakes at operation 311 (e.g., awakes from a sleep state) in response to this notification. The USB Host Controller 122 then transfers the data from/to the USB Device 110 (e.g., retrieved from one or more buffers such as the data buffer 160), and provides the data directly to/from the Offload Engine 124, as triggered by receipt of the DATA_AVAILABLE notification from the USB Device 110.

An Offload Engine 124 may be implemented with one or more simple microcontrollers with limited memory, or may be implemented in one or more accelerators that can perform specialized data processing. The Offload Engine 124 may include or orchestrate a specialized component (hardware, software, or software-configured hardware) for data processing from data received directly from the USB Device. The Process Data operation 321 is depicted as occurring at the Offload Engine 124, although in some examples data processing does not immediately occur by the Offload Engine 124 when the data processing is provided to specialized circuitry.

Once the data processing is completed, the Offload Engine 124 can either transfer the data to a software application/consumer or inform the software application/consumer of the processed data availability. This is depicted in FIG. 3 with a software action operation 322, implemented at the USB SW Stack 126. This action may be implemented at the USB SW Stack 126 or an application layer above the USB SW Stack 126 (e.g., an operating system, an installed software application, etc.), based on the type of action or additional operations to respond to the processed data in operation 322. Hence, automatically retrieving data from the USB Device and offloading/transferring this data to a specialized offload component will reduce USB Host main memory access and CPU utilization for such data transfers.

Changes in the USB standards can include a new Notification Type to implement the DATA_AVAILABLE notification provided from the USB Device 110 to the USB Host 120. In an example, this is provided as an addition to Table 8-18 of the USB 3.2 specification and changes in the USB Device Class specifications to support a new Notification Type. Consistent with the functionality above, this new Notification Type can be used to indicate that the USB Device has data available, which the USB Host Controller can transfer to/from the USB Device after receiving the Device Notification with the Notification Type. Consistent with the values defined in Table 8-18 of USB 3.2, a new Notification Type value "0110b" may be defined as a new Transfer Packet Type—for Notification Type 0110b.

A proposed update to the USB 3.2 specification to support this new notification type may be provided as follows:

TABLE 1

| Update to Table 8-18, Device Notification TP Format (Differences with ACK TP) | | |
|---|---|---|
| Width (bits) | Offset (DW:bit) | Description |
| 4 | 1:0 | SubType. This field shall be set to DEV_NOTIFICATION. |
| 4 | 1:4 | Notification Type. The field identifies the type of the device notification. |

| | Type of |
|---|---|
| Value | Notification Packet |
| 0000b | Reserved |
| 0001b | FUNCTION_WAKE |
| 0010b | LATENCY_TOLERANCE_ MESSAGE |
| 0011b | BUS_INTERVAL_ADJUST- MENT_MESSAGE |
| 0100b | HOST_ROLE_REQUEST |
| 0101b | SUBLINK_SPEED |

TABLE 1-continued

| Update to Table 8-18, Device Notification TP Format (Differences with ACK TP) | | |
|---|---|---|
| Width (bits) | Offset (DW:bit) | Description |
| | 0110b | DATA_AVAILABLE |
| | 0111b- | Reserved |
| | 1111b | |

FIG. 4 depicts an example of a proposed "Data Available Device Notification" Data Structure. Here, this includes a definition of a data value to indicate the size of the data available in bytes. In an example, the notification may be defined according to the following format:

TABLE 2

| New Data Available Device Notification Fields | | |
|---|---|---|
| Width (bits) | Offset (DW:bit) | Description |
| | 0 | See USB3.2 specification |
| 4 | 1:0 | SubType. This field shall be set to DEV_NOTIFICATION. |
| 4 | 1:4 | Notification Type. DATA_AVAILABLE |
| 8 | 1:8 | Interface. This field identifies the first interface in the function that caused the device to perform a remote wake operation. |
| 32 | 2:0 | Size of the data available in bytes |
| | 3 | See USB3.2 specification |

Figure 5:
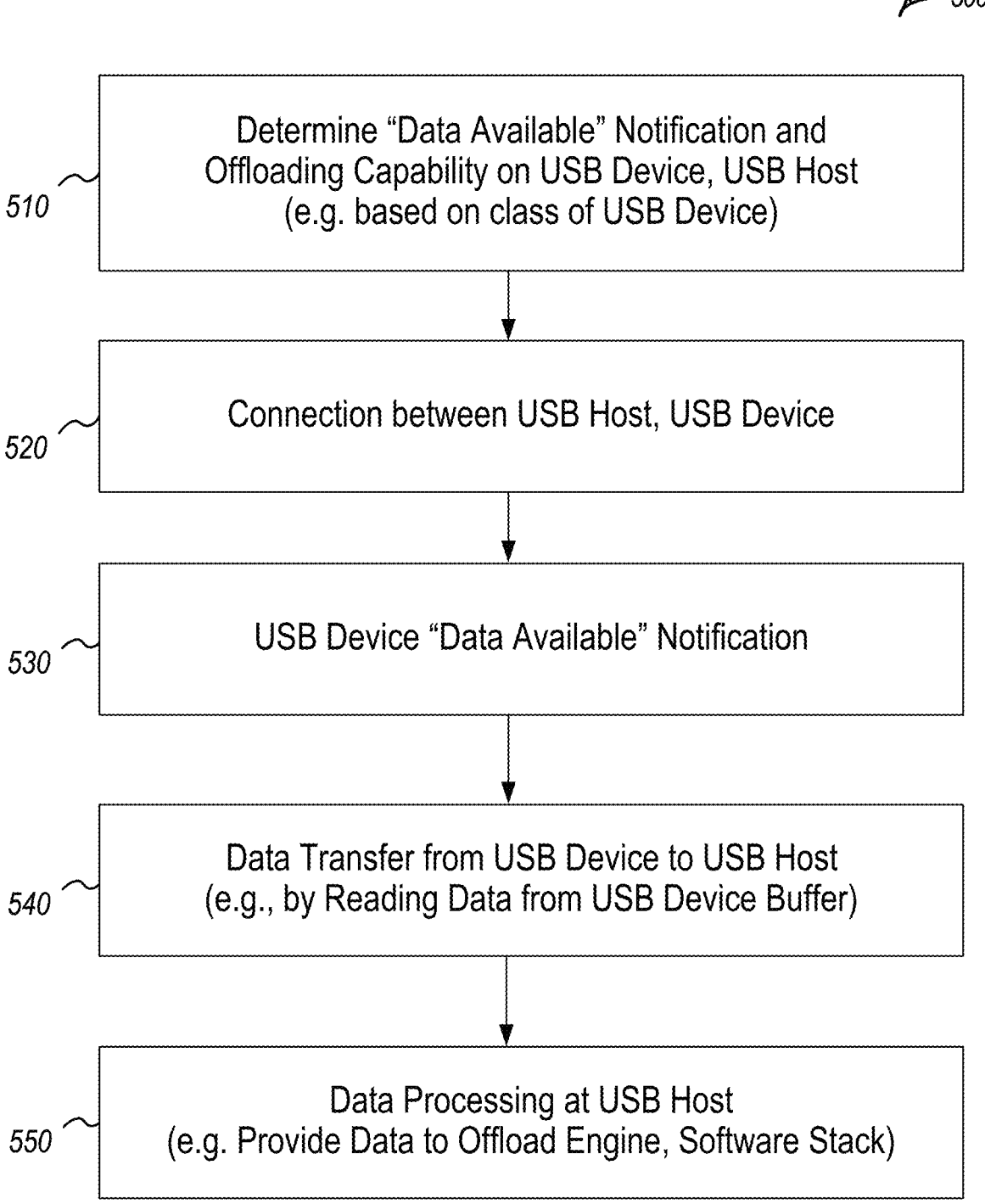
FIG. 5 illustrates a flowchart of an example method for Notification-Based USB Data Retrieval and Data Offloading, according to an example.

FIG. 5 illustrates a flowchart 500 of an example method for Notification-Based USB Data Retrieval and Data Offloading. The flowchart 500 includes operations performed from the perspective of the USB Host (e.g., USB Host 120). The method may implement the operations discussed with reference to the figures discussed above, or a variation of such operations. An example sequence of operations includes:

At operation 510, identifying the "Data Available" capability of the USB Device, and establishing a configuration for the class of USB Device. This may correspond to the evaluations 210, 301 and operations 302, 303, 304, 305 as noted above.

At operation 520, establishing a connection between the USB Host (e.g., USB Host 120) and the USB Device (e.g., USB Device 110) via a USB interface. This may correspond to the USB Device Detection and Enumeration 130 discussed above.

At operation 530, receiving and responding to an asynchronous USB Device Data Available Notification, sent from the USB Device to the USB Host. This may correspond to the notification 150 and operation 311 as discussed above.

At operation 540, transmitting data on the USB interface, by the USB Host reading data from the data buffer of the USB Device. This may correspond to the read operation of buffer 160, discussed above.

At operation 550, processing the data at the USB Host, by providing the data to an offload engine (e.g., Offload Engine 124) and a software stack (e.g. USB SW Stack 126). This may invoke or include the use of acceleration hardware and memory within the USB Host computing system, and the use of operations 321, 322, as discussed above.

Figure 6:
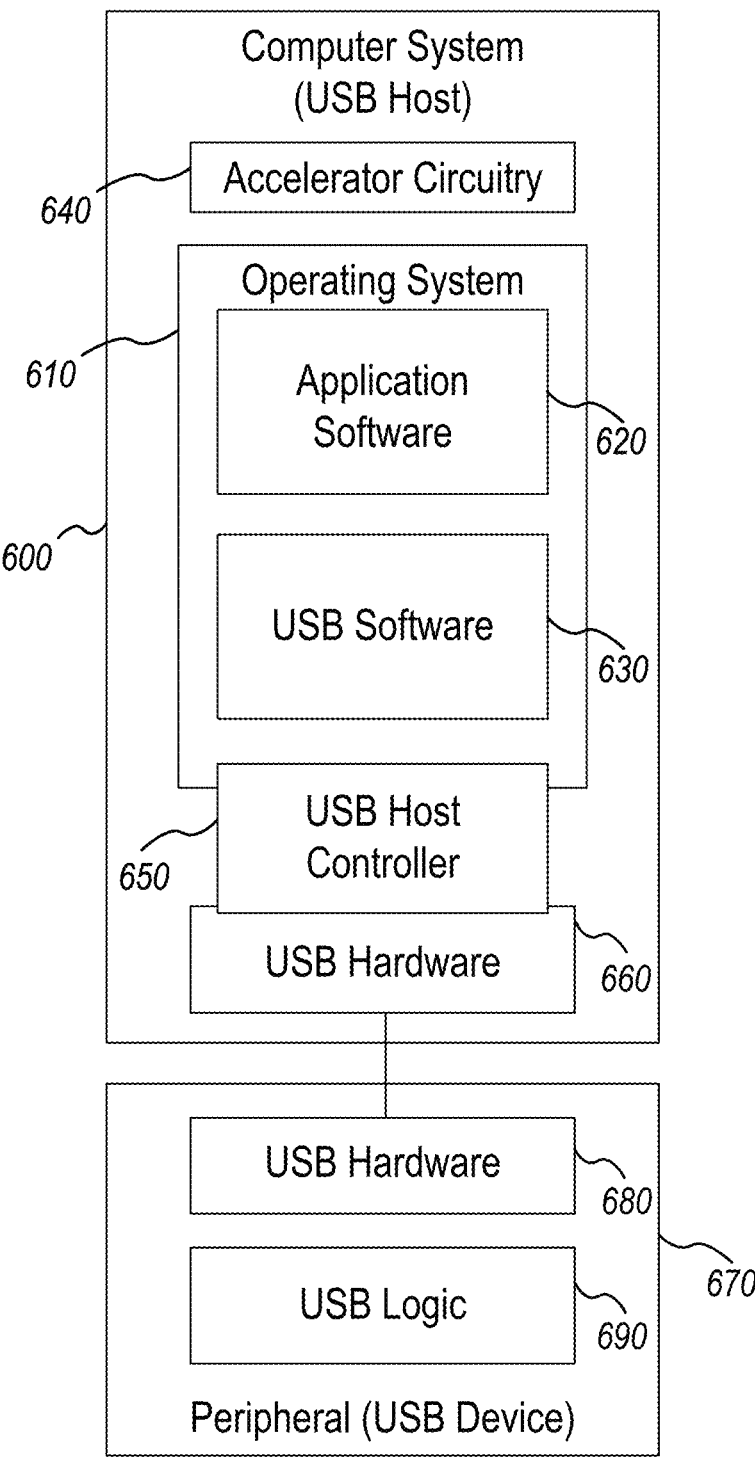
FIG. 6 is a block diagram illustrating a configuration of a computing system to operate USB hardware and software, according to an example.

FIG. 6 is a block diagram illustrating a configuration of a computing system 600 operating as a USB Host, connected to a USB Device 670 (e.g., a peripheral). As shown, the computing system 600 may include an operating system 610 with installed application software 620 and USB software 630 (e.g., an offload engine interface, and a software stack, as discussed above). The computing system 600 also includes a USB Host Controller 650 and other USB hardware 660 (e.g., specialized circuitry) configured to provide USB functions and the data notification and transfer/offloading functions as discussed above. The depicted computing system 600 also includes accelerator circuitry 640 which may perform processing on the data retrieved from USB Device 670 that is directly offloaded in response to the data notification and transfer functions as discussed above.

The computing system 600 is operably coupled to the USB Device 670 via a USB data connection (e.g., in accordance with USB 1, 2, or 3 standards). The USB Device 670 includes USB hardware 680 (e.g., specialized circuitry) and USB logic 690 (e.g., firmware and software) configured to perform the data notification and transfer functions as discussed above. The USB logic 690 configures the use of data buffers and notifications in the USB Device 670 so that the computing system 600 operating as a USB Host can be directly notified when data is ready to be transferred from the USB Device 670.

FIG. 7 illustrates a flowchart of example operations performed by a USB Host and a USB Device for Notification-Based USB Data Retrieval and Data Offloading. The flowchart may incorporate other operations discussed with reference to the figures discussed above, or a variation of such operations. In an example, the operations may be implemented in a USB Host operating as a computing system comprising a memory device (e.g., storage memory such as non-volatile memory, or in volatile memory) that stores processing instructions and data, and processing circuitry (e.g., at least one processor) that executes processing instructions. In another example, the operations may be implemented by at least one non-transitory machine-readable medium capable of storing instructions, where the instructions, when executed by circuitry (e.g., at least one processor) cause the circuitry to initiate, perform, or coordinate the operations.

At 710, the operations include receiving a Data Available Notification from a USB Device connected to a USB Host (e.g., at a USB Host Controller in a Sleep State, as the USB Host Controller is in this Sleep State until receipt of the Data Available Notification), with the USB Device and USB Host connected via a USB interface. In an example, the data available notification is initiated by the USB Device, such as described with reference to FIGS. 1 and 2 above. In an example, the Data Available Notification is a defined data structure that includes a first data value to identify a type of the data available notification, and a second data value to identify a size of the buffered data available to be read from the USB Device, such as described with reference to FIG. 4 above.

In further examples, before receiving the Data Available Notification, the circuitry may be configured to determine or validate that the USB Host includes functionality to receive the Data Available Notification from the USB Device and perform data offloading to the Offload Engine of the USB Host. Based on this determination, the circuitry may enable use of the Data Available Notification using a USB Software Stack of the USB Host.

At 720, the operations continue with reading Buffered Data from a Buffer of the USB Device, in response to the Data Available Notification. In an example, a USB Host Controller is configured to read the Buffered Data and to provide the Buffered Data to an Offload Component (e.g., Engine, Accelerator) based on the Data Available Notification. This configuration may result from a configuration of a data transfer mechanism or pipeline between the Offload Component and the USB Host Controller.

At 730, the operations continue with providing the Buffered Data to an Offload Component (e.g., Engine, Accelerator) at the USB Host. In some examples, an Offload Engine is configured to provide the Buffered Data to Acceleration Circuitry or other specialized processing hardware.

At 740, the operations continue with processing the Buffered Data with Offloading Component (e.g., Engine, Accelerator) of the USB Host. At 750, the operations continue with providing the Processed, Buffered Data to a USB Software Stack or a Software Application of the USB Host.

In further examples, additional determinations and verifications are performed to ensure that the USB Host can properly receive and process the Data Available Notification. This may include a determination or verification of whether the USB Device includes functionality to provide the Data Available Notification to the USB Host. Such functionality may be directly enabled or provided based on a USB Device Class (e.g., to only use or enable the Data Available Notification for particular classes of USB devices).

Although the preceding was discussed with reference to hardware accelerators, it will be understood that a variety of data transfer types, USB Device peripherals, and data processing hardware may be used. For example, the transfer of audio data, video data, and sensor data, may be dynamically and on-demand transferred from the USB Device in connection with a variety of augmented/virtual reality or environmental sensing use cases.

Embodiments to implement the approaches above may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media (e.g., represented in portions of computer system 800 in FIG. 8, discussed below).

A processor subsystem (e.g., processor 802 in FIG. 8, discussed below) may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Such components may be hardware, software, or firmware communicatively coupled to one or more processors in order to carry out the operations described herein. Components may be hardware components, and as such components may be considered tangible entities capable of performing specified operations and may be configured or arranged in a certain manner. In an example, circuits may be arranged (e.g., internally or with respect to external entities such as other circuits) in a specified manner as a component.

In an example, the whole or part of one or more computer systems (e.g., a standalone, client, or server computer system) or one or more hardware processors may be configured by firmware or software (e.g., instructions, an application portion, or an application) as a component that operates to perform specified operations. In an example, the software may reside on a machine-readable medium. In an example, the software, when executed by the underlying hardware of the component, causes the hardware to perform the specified operations. Accordingly, a hardware component is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the components need not be instantiated at any one moment in time. For example, where the components comprise a general-purpose hardware processor configured using software; the general-purpose hardware processor may be configured as respective different components at different times. Software may accordingly configure a hardware processor, for example, to constitute a particular component at one instance of time and to constitute a different component at a different instance of time. Components may also be software or firmware implementations, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or components may, collectively or individually, be embodied as circuitry that forms part of a larger system, for example, an integrated circuit (IC), system on-chip (SoC), desktop computers, laptop computers, tablet computers, servers, smart phones, etc.

As used in the present disclosure, the term "logic" may refer to firmware and/or circuitry configured to perform any of the aforementioned operations. Firmware may be embodied as code, instructions, or instruction sets and/or data that are hard-coded (e.g., nonvolatile) in memory devices and/or circuitry.

"Circuitry," as used in the present disclosure, may comprise, for example, singly or in any combination, hardwired circuitry, programmable circuitry, state machine circuitry, logic, and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture.

Figure 8:
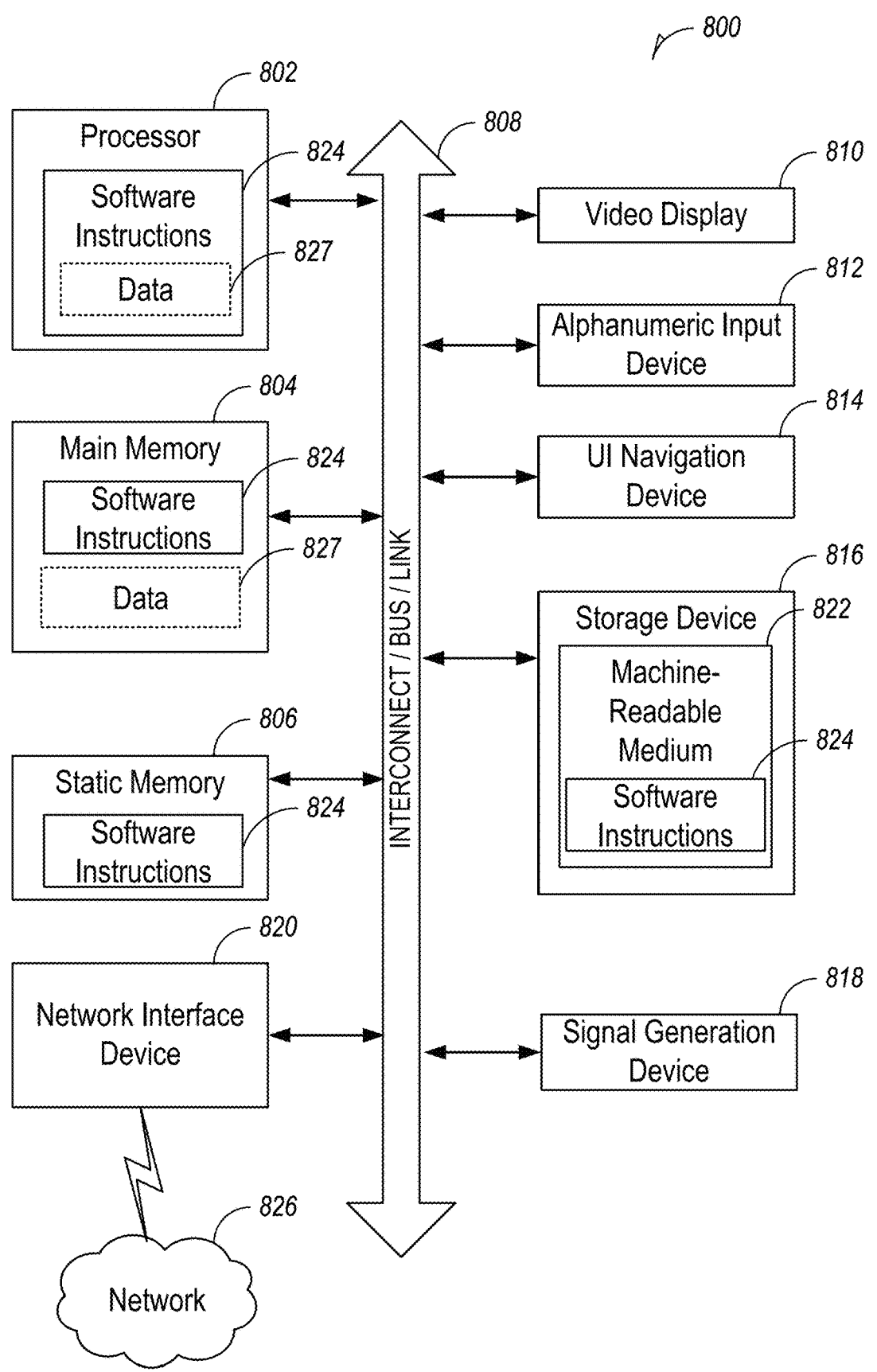
FIG. 8 is a block diagram illustrating an example machine upon which any one or more of the techniques (e.g., methodologies) discussed herein may perform, according to an example.

FIG. 8 is a block diagram illustrating a machine in the example form of a computer system 800, within which a set or sequence of instructions may be executed to cause the machine to perform any one of the methodologies discussed herein. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a personal computer (PC), a tablet PC, a hybrid tablet, a smartphone or other mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804, and a static memory 806, which communicate with each other via a link 808 (e.g., interconnect or bus). The computer system 800 may further include a video display unit 810, an alphanumeric input device 812 (e.g., a keyboard), and a user interface (UI) navigation device 814 (e.g., a mouse). In one aspect, the video display unit 810, input device 812, and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, gyrometer, magnetometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media. As an example, the software instructions 824 may include instructions to implement and execute the USB data transfer or processing operations via the processor (e.g., with software or logic as configured and operated in the examples of FIG. 1 to FIG. 7). As a further example, the main memory 804 (or the other memory 806 or the storage device 816) may host various data 827 provided via the USB data transfer operations discussed herein.

While the machine-readable medium 822 is illustrated in an example aspect to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, 6G, DSRC, or satellite communication networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Additional examples of the presently described embodiments include the following, non-limiting implementations. Each of the following non-limiting examples may stand on its own or may be combined in any permutation or combination with any one or more of the other examples provided below or throughout the present disclosure.

Example 1 is at least one non-transitory machine-readable medium capable of storing instructions, wherein the instructions, when executed by circuitry of a Universal Serial Bus USB Host, cause the circuitry to: receive a data available notification from a USB Device via a USB interface, the data available notification initiated by the USB Device, and the USB Device connected to the USB Host via the USB interface; read buffered data from a buffer of the USB Device, in response to the data available notification; and provide the buffered data to an Offload Engine of the USB Host.

In Example 2, the subject matter of Example 1 optionally includes subject matter where the instructions, when executed by the circuitry, cause the circuitry to: process the buffered data with the Offload Engine; and provide the processed buffered data to a USB Software Stack or a software application of the USB Host.

In Example 3, the subject matter of any one or more of Examples 1-2 optionally include subject matter where the data available notification is a defined data structure that includes a first data value to identify a type of the data available notification, and a second data value to identify a size of the buffered data available to be read from the USB Device.

In Example 4, the subject matter of any one or more of Examples 1-3 optionally include subject matter where the data available notification is received at a USB Host Controller of the USB Host, and wherein the USB Host Controller is in a sleep state until receipt of the data available notification.

In Example 5, the subject matter of any one or more of Examples 1-4 optionally include subject matter where the instructions, when executed by the circuitry, cause the circuitry to: determine that the USB Host includes functionality to receive the data available notification from the USB Device and perform data offloading to the Offload Engine of the USB Host; and enable use of the data available notification using a USB Software Stack of the USB Host.

In Example 6, the subject matter of Example 5 optionally includes subject matter where the instructions, when executed by the circuitry, cause the circuitry to: configure a USB Host Controller to read the buffered data and provide the buffered data to the Offload Engine, based on the data available notification.

In Example 7, the subject matter of Example 6 optionally includes subject matter where to configure the USB Host Controller, includes to enable a configuration of a data transfer mechanism between the Offload Engine and the USB Host Controller.

In Example 8, the subject matter of any one or more of Examples 6-7 optionally include subject matter where the Offload Engine is used to provide the buffered data to acceleration circuitry.

In Example 9, the subject matter of any one or more of Examples 5-8 optionally include subject matter where the instructions, when executed by the circuitry, cause the circuitry to: determine that the USB Device includes functionality to provide the data available notification to the USB Host.

In Example 10, the subject matter of Example 9 optionally includes subject matter where the functionality in the USB Host and the USB Device (to provide the data available notification to the USB Host) is enabled based on a USB device class.

Example 11 is a computing system configured as a Universal Serial Bus (USB) Host, the computing system comprising: a USB interface; and a USB Host Controller, configured to: receive a data available notification from a USB Device connected to the USB Host via the USB interface, the data available notification communicated to the USB Host from the USB Device; read buffered data from a buffer of the USB Device, in response to the data available notification; and provide the buffered data to an Offload Engine of the USB Host.

In Example 12, the subject matter of Example 11 optionally includes processing circuitry configured to: process the buffered data with the Offload Engine; and provide the processed buffered data to a USB Software Stack or a software application of the USB Host.

In Example 13, the subject matter of any one or more of Examples 11-12 optionally include subject matter where the data available notification is a defined data structure that includes a first data value to identify a type of the data available notification, and a second data value to identify a size of the buffered data available to be read from the USB Device.

In Example 14, the subject matter of any one or more of Examples 11-13 optionally include subject matter where the data available notification is received at the USB Host Controller, and wherein the USB Host Controller is in a sleep state until receipt of the data available notification.

In Example 15, the subject matter of any one or more of Examples 11-14 optionally include processing circuitry configured to: determine that the USB Host includes functionality to receive the data available notification from the USB Device and perform data offloading to the Offload Engine of the USB Host; and enable use of the data available notification using a USB Software Stack of the USB Host.

In Example 16, the subject matter of Example 15 optionally includes subject matter where the processing circuitry is further configured to: configure the USB Host Controller to read the buffered data and provide the buffered data to the Offload Engine, based on the data available notification.

In Example 17, the subject matter of Example 16 optionally includes subject matter where to configure the USB Host Controller, the processing circuitry is further configured to enable a configuration of a data transfer mechanism between the Offload Engine and the USB Host Controller.

In Example 18, the subject matter of any one or more of Examples 16-17 optionally include subject matter where the Offload Engine is used to provide the buffered data to acceleration circuitry.

In Example 19, the subject matter of any one or more of Examples 15-18 optionally include subject matter where the processing circuitry is further configured to: determine that the USB Device includes functionality to provide the data available notification to the USB Host.

In Example 20, the subject matter of Example 19 optionally includes subject matter where the functionality in the USB Host and the USB Device (to provide the data available notification to the USB Host) is enabled based on a USB device class.

Example 21 is a method for data offloading of data from a Universal Serial Bus USB Device to a USB Host, comprising: receiving a data available notification from a USB Device connected to the USB Host via a USB interface, the data available notification communicated to the USB Host from the USB Device; reading buffered data from a buffer of the USB Device, in response to the data available notification; and providing the buffered data to an Offload Engine of the USB Host.

In Example 22, the subject matter of Example 21 optionally includes processing the buffered data with the Offload Engine; and providing the processed buffered data to a USB Software Stack or a software application of the USB Host.

In Example 23, the subject matter of any one or more of Examples 21-22 optionally include subject matter where the data available notification is a defined data structure that includes a first data value to identify a type of the data available notification, and a second data value to identify a size of the buffered data available to be read from the USB Device.

In Example 24, the subject matter of any one or more of Examples 21-23 optionally include subject matter where the data available notification is received at a USB Host Controller of the USB Host, and wherein the USB Host Controller is in a sleep state until receipt of the data available notification.

In Example 25, the subject matter of any one or more of Examples 21-24 optionally include determining that the USB Host includes functionality to receive the data available notification from the USB Device and perform data offloading to the Offload Engine of the USB Host; and enabling use of the data available notification using a USB Software Stack of the USB Host.

In Example 26, the subject matter of Example 25 optionally includes configuring a USB Host Controller of the USB Host to read the buffered data and provide the buffered data to the Offload Engine, based on the data available notification.

In Example 27, the subject matter of Example 26 optionally includes subject matter where configuring the USB Host Controller, includes enabling a configuration of a data transfer mechanism between the Offload Engine and the USB Host Controller.

In Example 28, the subject matter of any one or more of Examples 26-27 optionally include subject matter where the Offload Engine is used to provide the buffered data to acceleration circuitry.

In Example 29, the subject matter of any one or more of Examples 25-28 optionally include determining that the USB Device includes functionality to provide the data available notification to the USB Host.

In Example 30, the subject matter of Example 29 optionally includes subject matter where the functionality in the USB Host and the USB Device (to provide the data available notification to the USB Host) is enabled is enabled based on a USB device class.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate aspect. The scope of the embodiments disclosed herein is to be determined with reference to the appended claims, along with the full scope of equivalents to which such claims are entitled.

What is claimed is:

1. At least one non-transitory machine-readable medium capable of storing instructions, wherein the instructions, when executed by circuitry of a Universal Serial Bus (USB) Host, cause the circuitry to:
determine that the USB Host includes functionality to receive a data available notification from a USB Device and perform data offloading to an Offload Engine of the USB Host in response to the data available notification;
receive the data available notification from the USB Device via a USB interface, the data available notification initiated by the USB Device, and the USB Device connected to the USB Host via the USB interface;
read buffered data from a buffer of the USB Device, in response to the data available notification; and
provide the buffered data to the Offload Engine of the USB Host.

2. The non-transitory machine-readable medium of claim 1, wherein the instructions, when executed by the circuitry, cause the circuitry to:
process the buffered data with the Offload Engine; and
provide the processed buffered data to a USB Software Stack or a software application of the USB Host.

3. The non-transitory machine-readable medium of claim 1, wherein the data available notification is a defined data structure that includes:
a first data value to identify a type of the data available notification, and
a second data value to identify a size of the buffered data available to be read from the USB Device.

4. The non-transitory machine-readable medium of claim 1, wherein the data available notification is received at a USB Host Controller of the USB Host, and wherein the USB Host Controller is in a sleep state until receipt of the data available notification.

5. The non-transitory machine-readable medium of claim 1, wherein the instructions, when executed by the circuitry, cause the circuitry to:
enable use of the data available notification using a USB Software Stack of the USB Host, in response to determining that the USB Host includes the functionality to receive the data available notification from the USB Device and perform the data offloading to the Offload Engine of the USB Host.

6. The non-transitory machine-readable medium of claim 5, wherein the instructions, when executed by the circuitry, cause the circuitry to:
configure a USB Host Controller to read the buffered data and provide the buffered data to the Offload Engine, based on the data available notification.

7. The non-transitory machine-readable medium of claim 6, wherein the instructions, when executed by the circuitry, cause the circuitry to:
enable a configuration of a data transfer mechanism between the Offload Engine and the USB Host Controller.

8. The non-transitory machine-readable medium of claim 6, wherein the Offload Engine is used to provide the buffered data to acceleration circuitry.

9. The non-transitory machine-readable medium of claim 5, wherein the instructions, when executed by the circuitry, cause the circuitry to:
determine that the USB Device includes functionality to provide the data available notification to the USB Host.

10. The non-transitory machine-readable medium of claim 9, wherein the functionality to provide the data available notification to the USB Host is enabled based on a USB device class.

11. A computing system configured as a Universal Serial Bus (USB) Host, the computing system comprising:
processing circuitry configured to:
determine that the USB Host includes functionality to receive a data available notification from a USB Device and perform data offloading to an Offload Engine of the USB Host in response to the data available notification;

a USB interface; and a USB Host Controller, configured to:

receive the data available notification from the USB Device connected to the USB Host via the USB interface, the data available notification communicated to the USB Host from the USB Device;

read buffered data from a buffer of the USB Device, in response to the data available notification; and provide the buffered data to the Offload Engine of the USB Host.

12. The computing system of claim 11, wherein the processing circuitry is further configured to:

process the buffered data with the Offload Engine; and provide the processed buffered data to a USB Software Stack or a software application of the USB Host.

13. The computing system of claim 11, wherein the data available notification is a defined data structure that includes: a first data value to identify a type of the data available notification, and a second data value to identify a size of the buffered data available to be read from the USB Device.

14. The computing system of claim 11, wherein the data available notification is received at the USB Host Controller, and wherein the USB Host Controller is in a sleep state until receipt of the data available notification.

15. The computing system of claim 11, further comprising wherein the processing circuitry is further configured to:

enable use of the data available notification using a USB Software Stack of the USB Host, in response to determining that the USB Host includes the functionality to receive the data available notification from the USB Device and perform the data offloading to the Offload Engine of the USB Host.

16. The computing system of claim 15, wherein the processing circuitry is further configured to:

configure the USB Host Controller to read the buffered data and provide the buffered data to the Offload Engine, based on the data available notification.

17. The computing system of claim 16, wherein to configure the USB Host Controller, the processing circuitry is further configured to enable a configuration of a data transfer mechanism between the Offload Engine and the USB Host Controller.

18. The computing system of claim 16, wherein the Offload Engine is used to provide the buffered data to acceleration circuitry.

19. The computing system of claim 15, wherein the processing circuitry is further configured to:

determine that the USB Device includes functionality to provide the data available notification to the USB Host.

20. The computing system of claim 19, wherein the functionality to provide the data available notification to the USB Host is enabled based on a USB device class.

* * * * *